United States Patent
Gao et al.

(10) Patent No.: US 11,074,841 B2
(45) Date of Patent: Jul. 27, 2021

(54) FLEXIBLE DISPLAY PANEL AND DISPLAY DEVICE

(71) Applicant: WuHan TianMa Micro-electronics CO., LTD, Wuhan (CN)

(72) Inventors: Xiangyu Gao, Wuhan (CN); Jingxiong Zhou, Wuhan (CN); Guang Wang, Wuhan (CN)

(73) Assignee: WuHan TianMa Micro-electronics CO., LTD, Wuhan (CN)

( * ) Notice: Subject to any disclaimer, the term of this patent is extended or adjusted under 35 U.S.C. 154(b) by 156 days.

(21) Appl. No.: 16/460,809

(22) Filed: Jul. 2, 2019

(65) Prior Publication Data
US 2020/0296843 A1 Sep. 17, 2020

(30) Foreign Application Priority Data
Mar. 15, 2019 (CN) .......................... 201910198601.0

(51) Int. Cl.
*G09G 3/00* (2006.01)

(52) U.S. Cl.
CPC ..... *G09G 3/035* (2020.08); *G09G 2300/0465* (2013.01); *G09G 2320/028* (2013.01); *G09G 2320/0233* (2013.01)

(58) Field of Classification Search
CPC .......... G09G 3/035; G09G 2320/0233; G09G 2320/028; G09G 2300/0465; G02F 1/134309; G02F 1/133305
See application file for complete search history.

(56) References Cited

U.S. PATENT DOCUMENTS

| | | | | |
|---|---|---|---|---|
| 2007/0262916 A1* | 11/2007 | Kee | ...................... | G02F 1/13336 345/1.3 |
| 2010/0270917 A1* | 10/2010 | Chuang | ............... | G02F 1/13439 313/505 |
| 2017/0133449 A1* | 5/2017 | Kim | ...................... | H01L 27/326 |
| 2017/0227805 A1* | 8/2017 | Chong | .............. | G02F 1/134309 |
| 2018/0366052 A1* | 12/2018 | Shi | ........................ | G09G 3/2074 |

FOREIGN PATENT DOCUMENTS

| | | |
|---|---|---|
| CN | 103424901 A | 12/2013 |
| CN | 104751747 A | 7/2015 |

OTHER PUBLICATIONS

First Chinese Office Action, dated Jul. 28, 2020, issued in corresponding Chinese Application No. 201910198601.0, filed Mar. 15, 2019, 12 pages.

* cited by examiner

*Primary Examiner* — Jonathan A Boyd
(74) *Attorney, Agent, or Firm* — Christensen O'Connor Johnson Kindness PLLC

(57) ABSTRACT

A flexible display panel and a display device are provided. The flexible display panel has a bent edge area and a planar area. The bent edge area and the planar area are arranged in the row direction. A boundary extends in the column direction between each of the at least one bent edge area and the planar area. A side of the bent edge area that is away from the planar area is bent towards a non-light-exiting side of the flexible display panel, so that a portion of the flexible display panel that is located in the bent edge area forms a curved surface when the flexible display panel is in a bent state. A size of each column of sub-pixels located in the edge area in the row direction is larger than a size of each column of sub-pixels located in the planar area in the row direction.

12 Claims, 7 Drawing Sheets

FLEXIBLE DISPLAY PANEL AND DISPLAY DEVICE

CROSS-REFERENCE TO RELATED APPLICATIONS

The present disclosure claims priority to Chinese Patent Application No. 201910198601.0, filed on Mar. 15, 2019, the content of which is incorporated herein by reference in its entirety.

TECHNICAL FIELD

The present disclosure relates to the field of display technologies, and in particular, to a flexible display panel and display device.

BACKGROUND

Organic light emitting display (OLED) panels have been used in more and more applications due to their excellent performances such as self-luminosity, high brightness, wide visual angle, and fast response. Moreover, the organic light emitting display panel may be designed as a flexible display panel. For a display device using the flexible display panel, an edge of the flexible display panel may be bent towards a back side (non-light-exiting side) of the flexible display panel, by utilizing its bendability, so as to increase a screen occupancy ratio. In this case, when a user views the display device from its front side, he/she will not see the edge of the display panel bent to the back side. In this way, the screen occupancy ratio of the front side of the display device is increased.

However, for the display panel having the edge bent towards the back side, a curved surface is formed at the edge of the front side of the display device. As a result, the display effect is degraded.

SUMMARY

In an embodiment of the present disclosure, a flexible display panel and a display device are provided, which can mitigate the degradation of the display effect resulted from the curved surface formed by bending the edge of the display panel to the back side.

In an aspect, the present disclosure provides a flexible display panel, having at least one bent edge area and a planar area. The flexible display panel includes a plurality of sub-pixels arranged in a matrix in a row direction and a column direction that is perpendicular to the row direction. The at least one bent edge area and the planar area are arranged in the row direction, a boundary extends in the column direction between each of the at least one bent edge area and the planar area, a side of each of the at least one bent edge area that is away from the planar area is bent towards a non-light-exiting side of the flexible display panel, so that a portion of the flexible display panel that is located in each of the at least one bent edge area forms a curved surface and the flexible display panel is in a bent state. A size of each column of sub-pixels located in the at least one bent edge area in the row direction is larger than a size of each column of sub-pixels located in the planar area in the row direction.

A plurality of sub-pixels arranged in a matrix having a row direction and a column direction that is perpendicular to the row direction. The at least one bent edge area and the planar area are arranged along the row direction, a boundary extending along the column direction is arranged between each of the at least one bent edge area and the planar area, a portion of flexible display panel located at an end of each of the at least one bent edge area away from the planar area is bent toward a non-light-exiting side of the flexible display panel, so that the flexible display panel has a curved surface formed in each of the at least one bent edge area, and the flexible display panel is in a bent state. A size of each column of sub-pixels located in the at least one bent edge area in the row direction is larger than a size of each column of sub-pixels located in the planar area in the row direction.

In another aspect, the present disclosure provides a display device, including the abovementioned flexible display panel.

BRIEF DESCRIPTION OF DRAWINGS

In order to more clearly illustrate technical solutions in embodiments of the present disclosure or in the related art, the accompanying drawings used in the embodiments and in the related art are briefly introduced as follows. It should be noted that the drawings described as follows are merely part of the embodiments of the present disclosure, other drawings can also be acquired by those skilled in the art.

DESCRIPTION OF EMBODIMENTS

In order to make the purpose, technical solutions, and advantages of the embodiments of the present disclosure better understood, the technical solutions in the embodiments of the present disclosure are described in the following with reference to the accompanying drawings. It should be understood that the described embodiments are merely exemplary embodiments of the present disclosure, which shall not be interpreted as providing limitations to the present disclosure. All other embodiments obtained by those skilled in the art according to the embodiments of the present disclosure are within the scope of the present disclosure.

The terms used in the embodiments of the present disclosure are merely for the purpose of describing particular embodiments but not intended to limit the present disclosure. Unless otherwise noted in the context, the singular form expressions "a", "an", "the" and "said" used in the embodiments and appended claims of the present disclosure are also intended to represent plural form expressions thereof.

Figure 1:
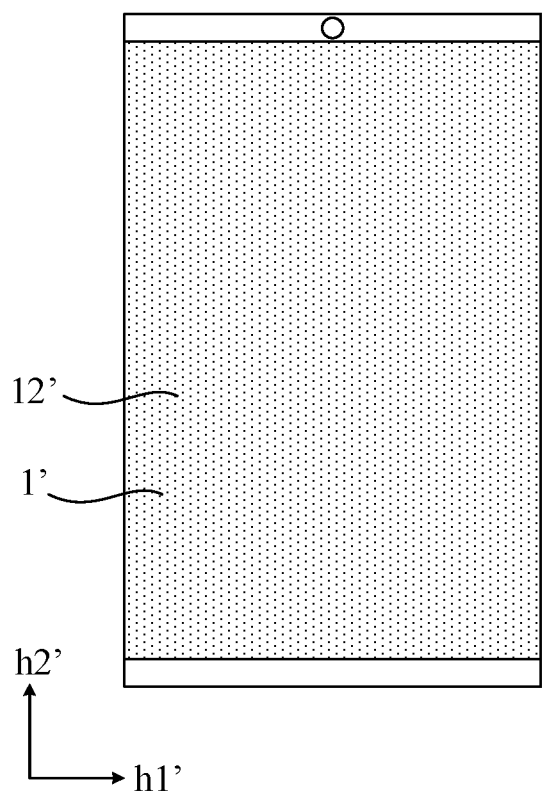
FIG. 1 is a schematic structural diagram of a display device in the related art.
Figure 2:
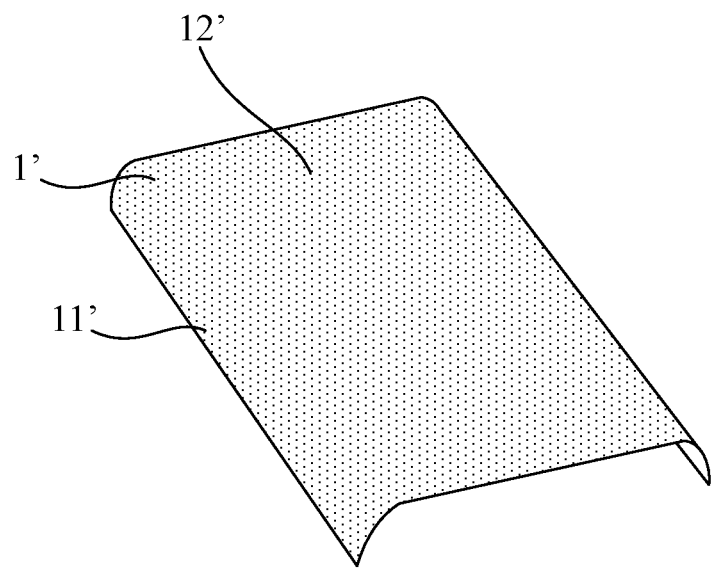
FIG. 2 is a perspective structural diagram of a flexible display panel of the display device shown in FIG. 1.
Figure 3:
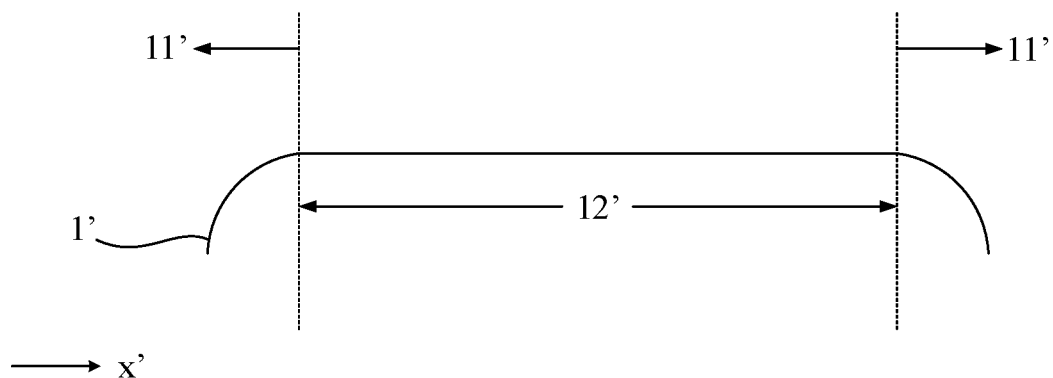
FIG. 3 is a cross-sectional structural diagram of the flexible display panel shown in FIG. 2 that is in a bent state.
Figure 4:
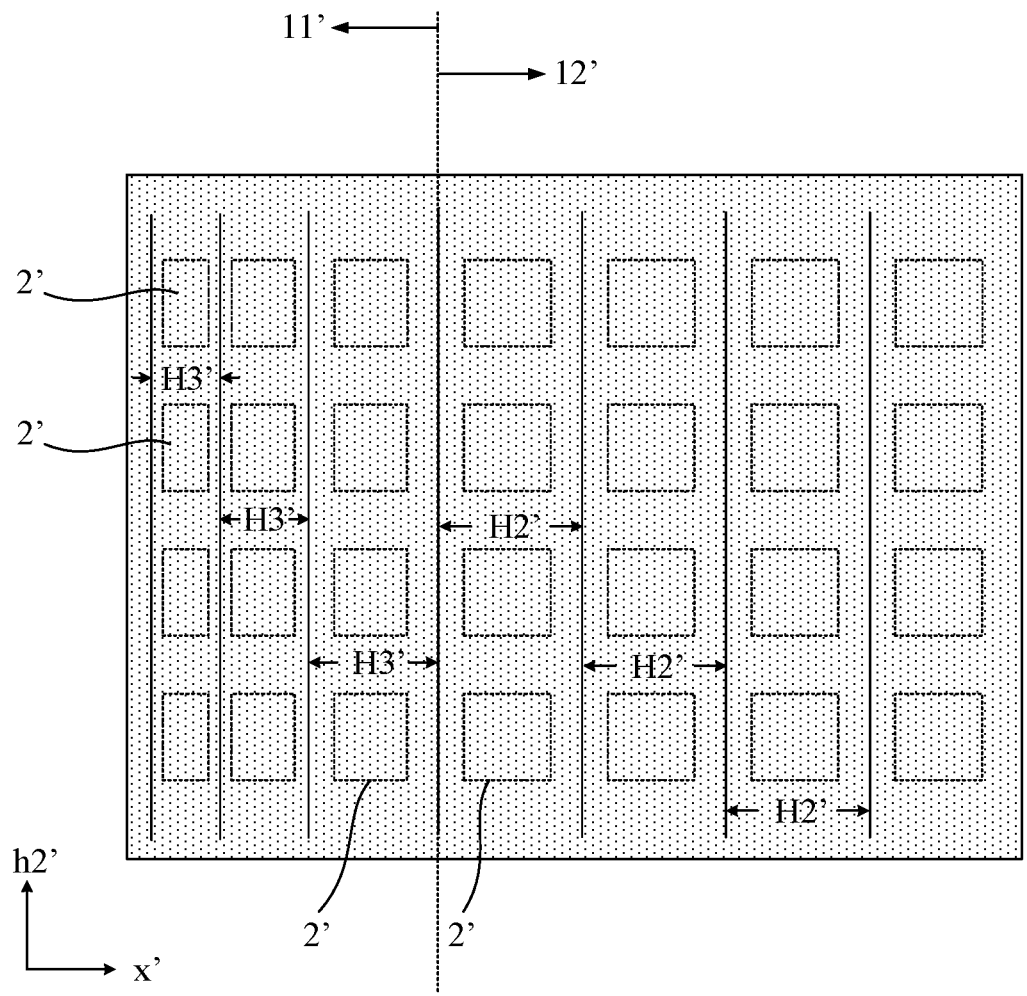
FIG. 4 is a schematic structural diagram of a portion of the flexible display panel shown in FIG. 3 at a front viewing angle.
Figure 5:
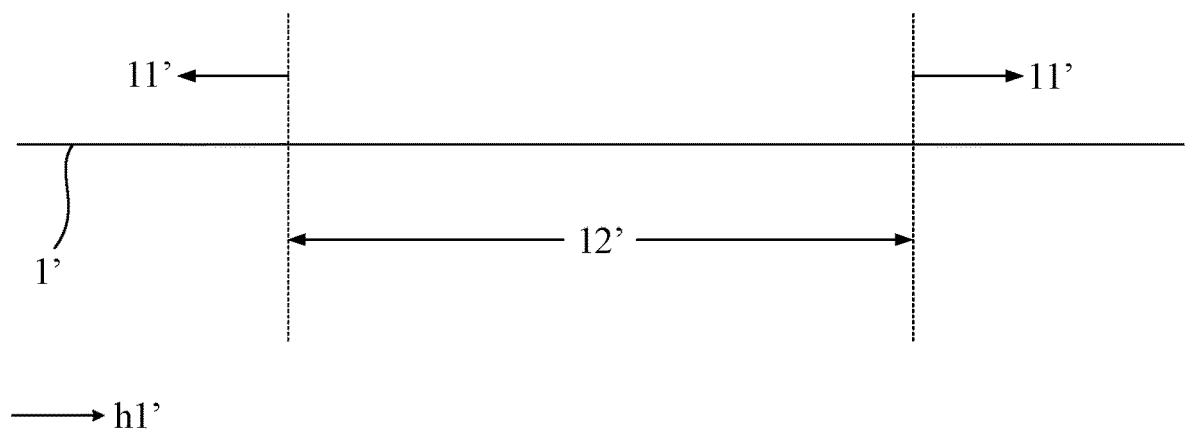
FIG. 5 is a cross-sectional structural diagram of the flexible display panel shown in FIG. 2 that is in a flattened state.
Figure 6:
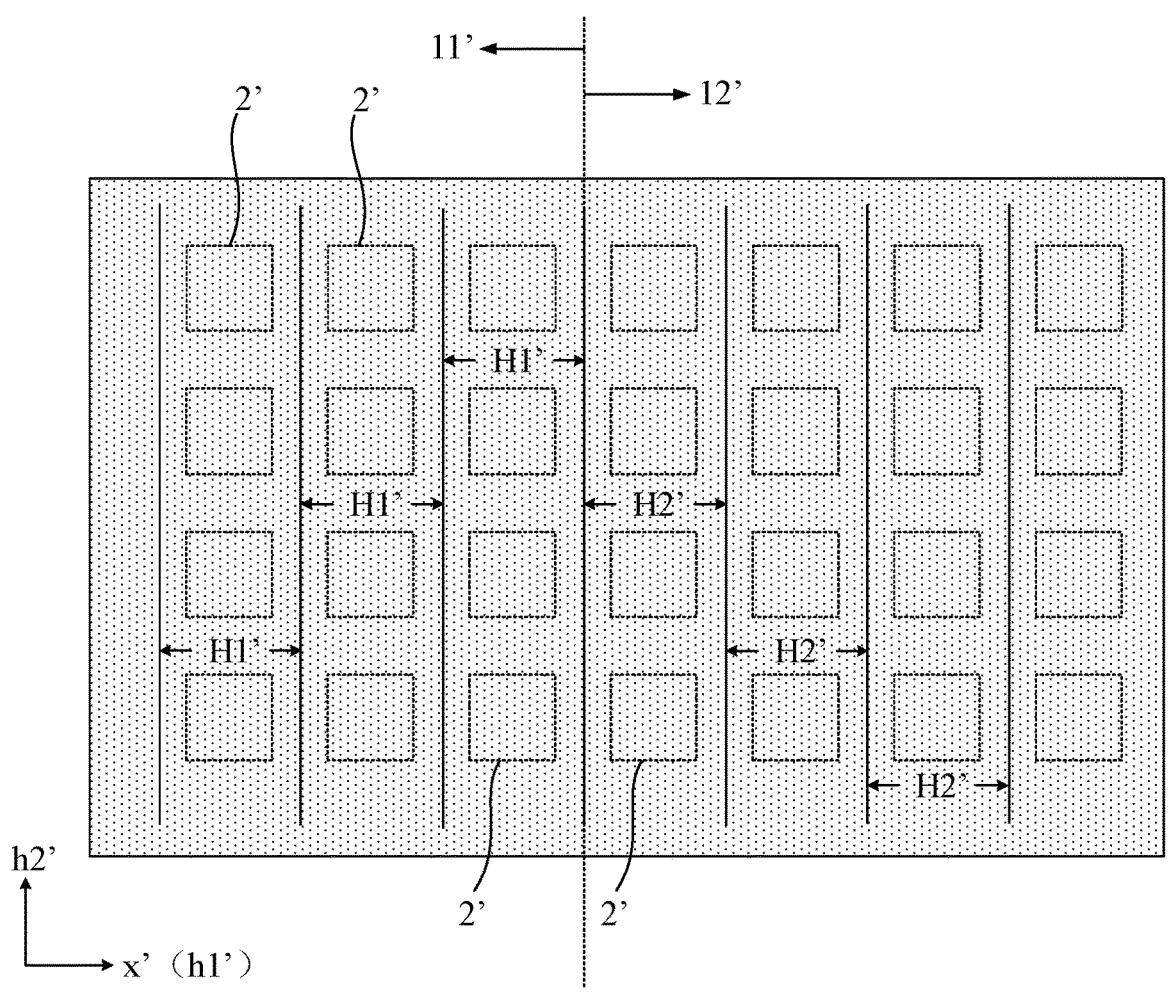
FIG. 6 is a schematic structural diagram of a portion of the flexible display panel show in FIG. 5 at a front viewing angle.

In order to further illustrate advantageous effects of the embodiments of the present disclosure, the problems existing in the related art will be explained prior to detailed description of the embodiments of the present disclosure. Herein, FIG. 1 is a schematic structural diagram of a display device in the related art; FIG. 2 is a perspective structural diagram of a flexible display panel of the display device shown in FIG. 1; FIG. 3 is a cross-sectional structural diagram of the flexible display panel shown in FIG. 2 that is in a bent state; FIG. 4 is a schematic structural diagram of a portion of the flexible display panel shown in FIG. 3 at a front viewing angle; FIG. 5 is a cross-sectional structural diagram of the flexible display panel shown in FIG. 2 that is in a flattened state; and FIG. 6 is a schematic structural diagram of a portion of the flexible display panel show in FIG. 5 at a front viewing angle. With reference to FIGS. 1-6, the display device includes a flexible display panel 1'. The flexible display panel 1' has a bent edge area 11' and a planar area 12'. In the display device, a portion of the flexible display panel 1' that is located in the bent edge area 11' is bent towards a non-light-exiting side of the flexible display panel 1' (i.e., a back side of the flexible display panel 1'), so that the flexible display panel 1' has a curved surface formed in the bent edge area 11', that is, the flexible display panel 1' is in a bent state. In this way, the screen occupancy ratio of the display device at a front viewing angle can be increased. In the figures, a dot-filled area represents a light-exiting side of the flexible display panel 1'. The flexible display panel 1' is manufactured in a flattened state. In the flattened state, a plurality of sub-pixels 2' is evenly distributed in a matrix in a row direction h1' and a column direction h2'. In the figures, a dotted-line rectangle represents a pixel aperture corresponding to a sub-pixel 2', and the sub-pixel 2' emits light at the pixel aperture to achieve a display function. At the front viewing angle, each column of sub-pixels 2' has a same size in the row direction h1'. That is, a size H1' of each column of sub-pixels 2' located in the bent edge area 11' in the row direction h1' is equal to a size H2' of each column of sub-pixels 2' located in the planar area 12' in the row direction h1'. Each sub-pixel 2' corresponds to a same pixel aperture area. In the bent state, the size of each column of sub-pixels 2' located in the planar area 12' does not change at the front viewing angle, but an orthographic projection of each of sub-pixels 2' located in the bent edge area 11' onto a plane of the planar area 12' has a size H3' in a direction x' at the front viewing angle that is smaller than that in the flattened state. That is, the size H3' is smaller than the size H2' of each column of sub-pixels 2' located in the planar area 12' in the row direction h1'. Herein, the direction x' is the same as the row direction h1' in the planar area 12'. The front viewing angle is a viewing angle at which the user views the flexible display panel 1' from the front side of the display device (i.e., the light-exiting side of the planar area of the flexible display panel), that is, the viewing angle from top to bottom in FIG. 3 and FIG. 5. In the related art, on one hand, a curved surface is formed in the edge area of the front side of the display device when a portion of the flexible display panel 1' that is located in the edge area is bent towards the back side, so that the display effect in the bent edge area 11' and the display effect in the planar area 12' are different at the front viewing angle. On the other hand, the brightness of each sub-pixel needs to be collected by an camera at the front viewing angle after the display panel is manufactured, so as to compensate for data of the sub-pixel can based on the collected data, but changing of the size of each column of sub-pixels in the bent edge area 11' at the front viewing angle may lead to decreased collection accuracy of the sub-pixels by the camera, which in turn causes adverse effects on compensation for the data of the sub-pixels, thereby adversely affecting the final display effect.

Figure 7:
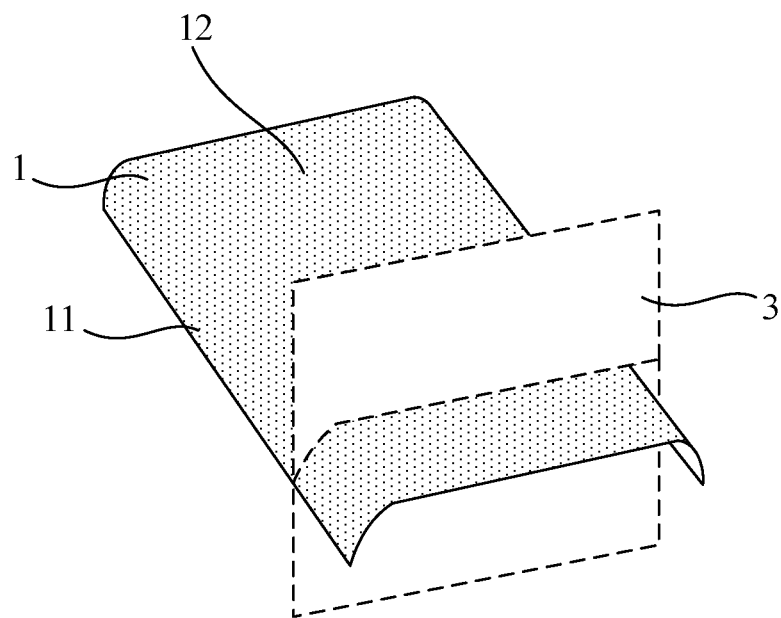
FIG. 7 is a schematic perspective structural diagram of a flexible display panel according to an embodiment of the present disclosure.
Figure 8:
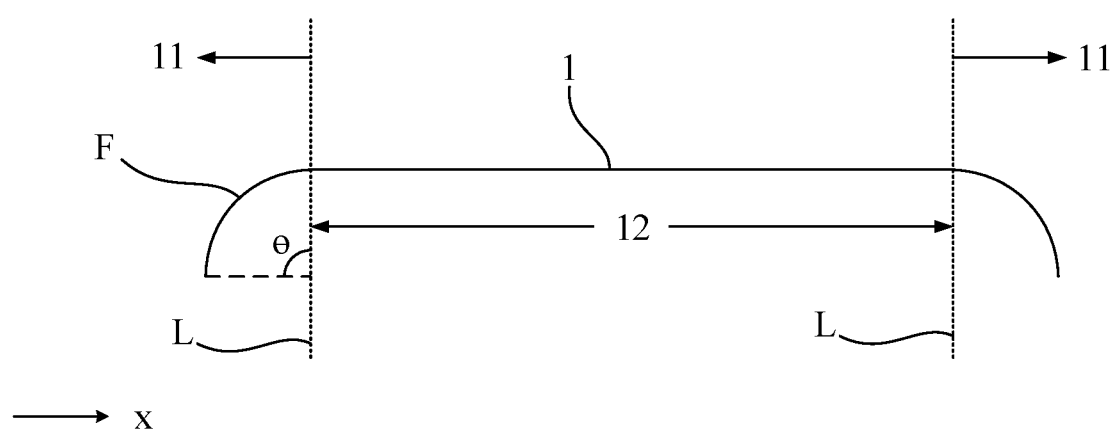
FIG. 8 is a schematic cross-sectional structural diagram of the flexible display panel show in FIG. 7 in a bent state.
Figure 9:
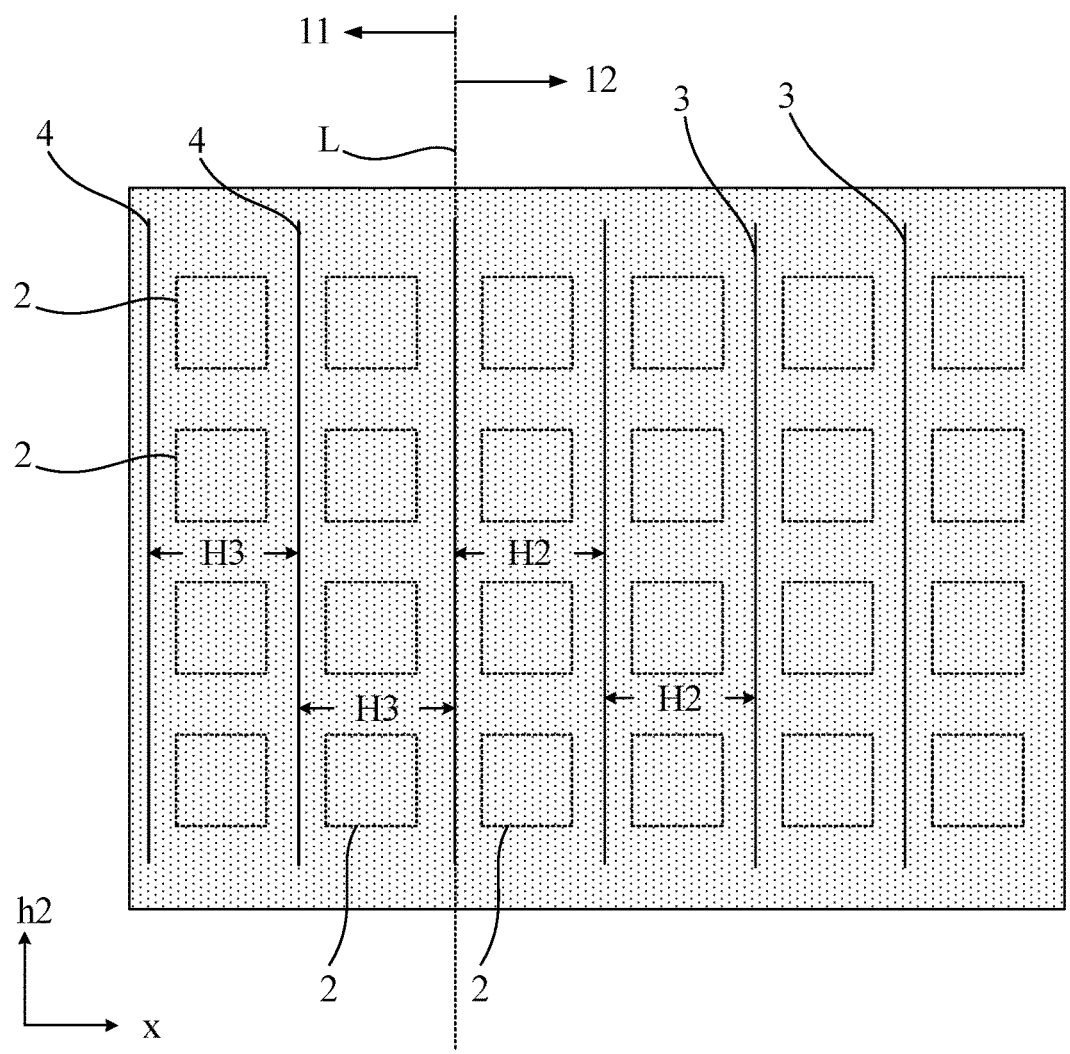
FIG. 9 is a schematic structural diagram of a portion of the flexible display panel shown in FIG. 7 at a front viewing angle.
Figure 10:
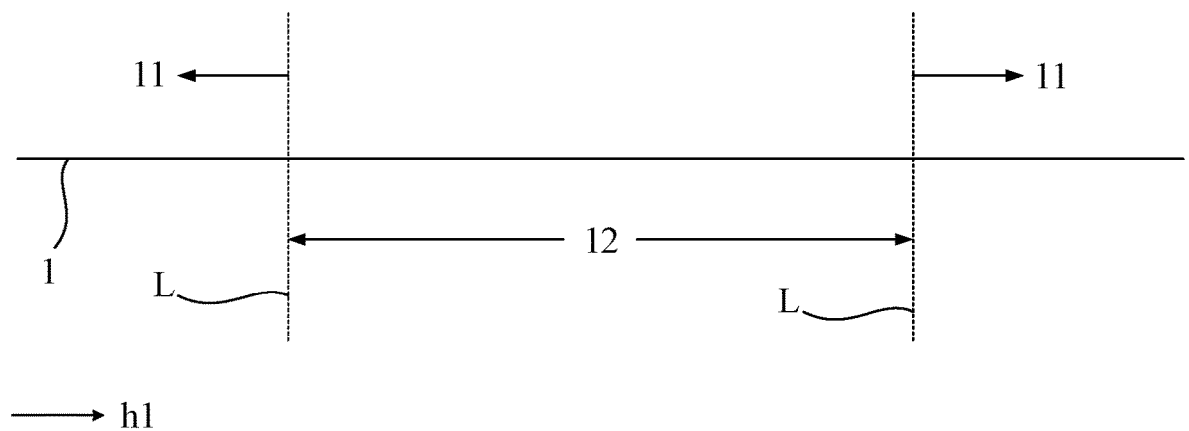
FIG. 10 is a cross-sectional structural diagram of the flexible display panel shown in FIG. 7 in a flattened state.
Figure 11:
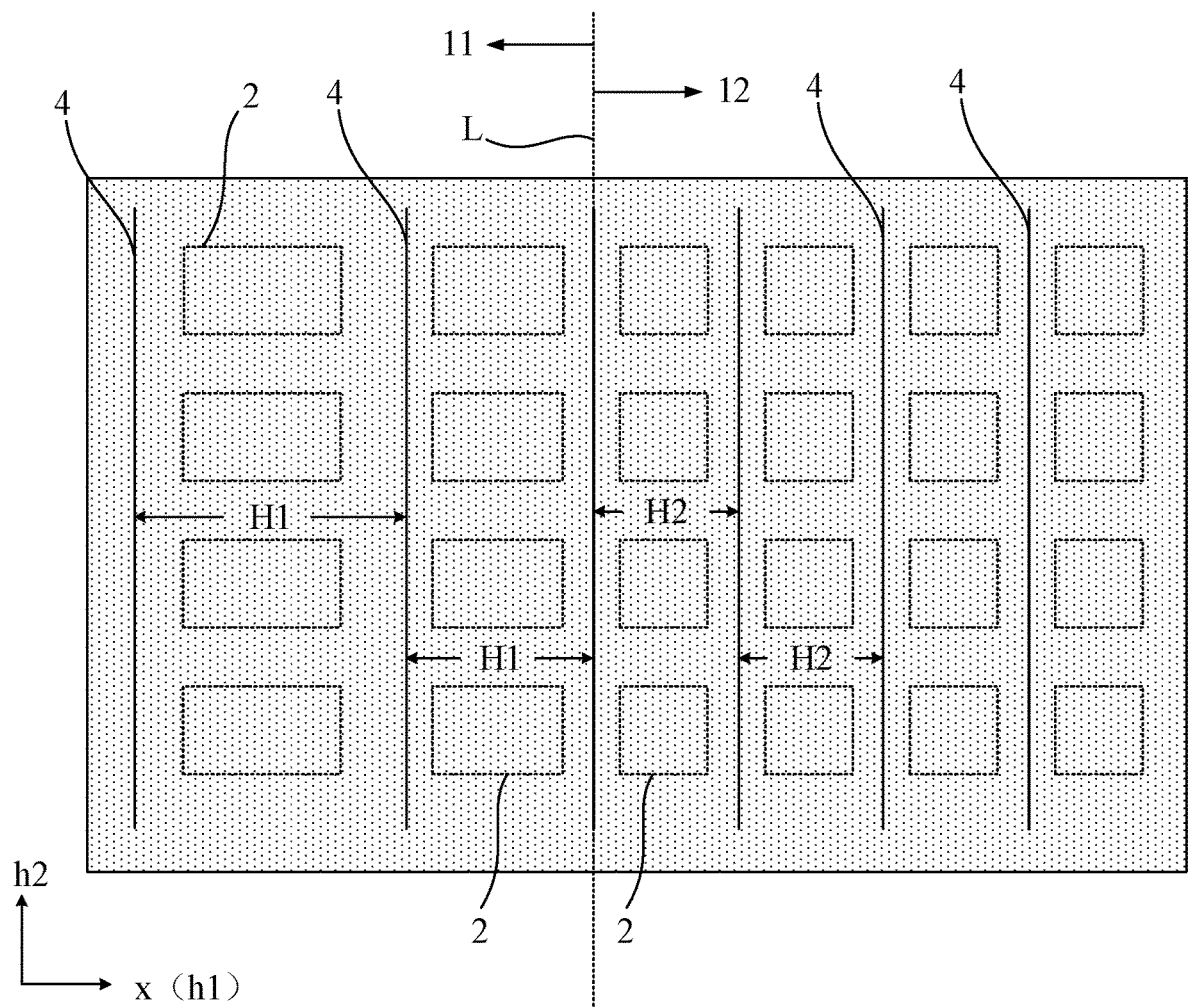
FIG. 11 is a schematic structural diagram of a portion of the flexible display panel shown in FIG. 10 at a front viewing angle.

FIG. 7 is a schematic perspective structural diagram of a flexible display panel according to an embodiment of the present disclosure; FIG. 8 is a schematic cross-sectional structural diagram of the flexible display panel show in FIG. 7 in a bent state; FIG. 9 is a schematic structural diagram of a portion of the flexible display panel shown in FIG. 7 at a front viewing angle; FIG. 10 is a cross-sectional structural diagram of the flexible display panel shown in FIG. 7 in a flattened state; and FIG. 11 is a schematic structural diagram of a portion of the flexible display panel shown in FIG. 10 at a front viewing angle. With reference to FIGS. 7-11, an embodiment of the present disclosure provides a flexible display panel 1. The flexible display panel 1 includes a plurality of sub-pixels 2 that is arranged in a matrix in a row direction h1 and a column direction h2. The row direction h1 is perpendicular to the column direction h2. It should be noted that the row direction h1 and the column direction h2 are two directions on a plane of the flexible display panel 1, i.e., two directions on the plane of the flexible display panel 1 being in a flattened state. The flexible display panel 1 has a bent edge area 11 and a planar area 12. The bent edge area 11 and the planar area 12 are arranged in the row direction h1. A boundary L extends in the column direction h2 between the bent edge area 11 and the planar area 12. A side of the bent edge area 11 that is away from the planar area 12 is bent towards the non-light-exiting side of the flexible display panel 1 (herein in the figures, a dot-filled area represents the light-exiting side of the flexible display panel 1, and the side opposite to the light-exiting side is the non-light-exiting side), so that a portion of the flexible display panel 1 that is located in the bent edge area 11 forms a curved surface, that is, the flexible display panel 1 is in a bent state. A size H1 of each column of sub-pixels 2 located in the bent edge area 11 in the row direction h1 is larger than a size H2 of each column of sub-pixels 2 located in the planar area 12 in the row direction h1. The size H1 and the size H2 are actual sizes on the plane of the flexible display panel 1, i.e., two sizes on the plane of the flexible display panel 1 while in a flattened state. In the figures, a dotted-line rectangle represents a pixel aperture corresponding to a sub-pixel 2, and the sub-pixel 2 emits light at the pixel aperture to achieve a display function. It should be noted that, in the embodiments of the present disclosure, a final product of the flexible display panel 1 is in the bent state as shown in FIG. 7, FIG. 8 and FIG. 9, and the flexible display panel 1 that is finally disposed in the display device is also in the bent state. However, the flexible display panel 1 is formed in a flattened state as shown in FIGS. 10 and 11 when being fabricated. Therefore, unless indicated otherwise, in the embodiments of the present disclosure, any reference to a size of the flexible display panel 1 relates to an actual size thereof, i.e., a size on the plane of the flexible display panel 1 while in a flattened state.

In particular, the size H1 of each column of sub-pixels 2 located in the bent edge area 11 in the row direction h1 is larger than the size H2 of each column of sub-pixels 2 located in the planar area 12 in the row direction h1. In this case, when the portion of the flexible display panel 1 that is located in the bent edge area 11 is bent to form a curved surface, an orthographic projection of each column of sub-pixels 2 located in the bent edge area 11 onto a plane of the planar area 12 has a smaller size in an x direction at the front viewing angle than that in the flattened state. Herein, the x direction is the same as the row direction h1 in the planar area 12. The front viewing angle is a viewing angle at which the user views the flexible display panel 1' from the front side of the display device (i.e., the light-exiting side of the planar area of the flexible display panel), i.e., the viewing angle from top to bottom in FIG. 8 and FIG. 10. In this way, in a bent state and at the front viewing angle, the size of the orthographic projection of each column of sub-pixels 2 located in the bent edge area 11 onto the plane of the planar area 12 in the row direction x is closer to the size of each column of sub-pixels 2 located in the planar area 12 in the row direction h1.

In this embodiment of the present disclosure, the size of each column of sub-pixels located in the bent edge area in the row direction is larger than the size of each column of sub-pixels located in the planar area in the row direction, so that in a bent state and at the front viewing angle, the size of each column of sub-pixels located in the bent edge area is closer to the size of each column of sub-pixels located in the planar area. In this way, on one hand, the display effect in the bent edge area becomes consistent with the display effect in the planar area at the front viewing angle, thereby mitigating a degradation of the display effect resulted from the curved surface formed in the bent edge area. On the other hand, since the size of each column of sub-pixels located in the bent edge area has a smaller difference from the size of each column of sub-pixels located in the planar area, sub-pixel brightness collection accuracy can be improved when the brightness of each sub-pixel is collected by the camera at the front viewing angle of. In this way, the effect of compensation for the data of the sub-pixel is more accurate, thereby improving the display effect.

In an embodiment, in the bent edge area 11, the size H1 of each column of sub-pixels 2 in the row direction h1 gradually increases as getting further away from the planar area 12.

In the bent state, the farther the distance from the planar area 12 is, the larger the curving angle will be, and the larger the size of the orthographic projection of the column of sub-pixels 2 onto the plane of the planar area 12 in the x direction will be. Therefore, in the bent edge area 11, the size H1 of each column of sub-pixels 2 in the row direction h1 gradually increases as getting further away from the planar area 12, so that in the bent state and at the front viewing angle, the size of the orthographic projection of each column of sub-pixels 2 onto the plane of the planar area 12 in the x direction becomes uniform or almost uniform. In this way, the degradation of the display effect resulting from the curved surface formed in the bent edge area can be further mitigated.

In an embodiment, the size H3 of the orthographic projection of each column of sub-pixels 2 located in the bent edge area 11 onto the plane of the planar area 12 in the row direction h1 of the planar area 12 (the row direction h1 of the planar area 12 is the x direction) is equal to the size H2 of each column of sub-pixels 2 located in the planar area 12 in the row direction h1.

H3 is equal to H2, and even at the front viewing angle, the display effect of the sub-pixel 2 located in the bent edge area 11 is exactly the same as that of the sub-pixel 2 located in the planar area 12. In this way, the viewing display effect is improved and the sub-pixel brightness collection accuracy is improved, thereby making the data compensation more accurate, further improving the display effect.

Figure 12:
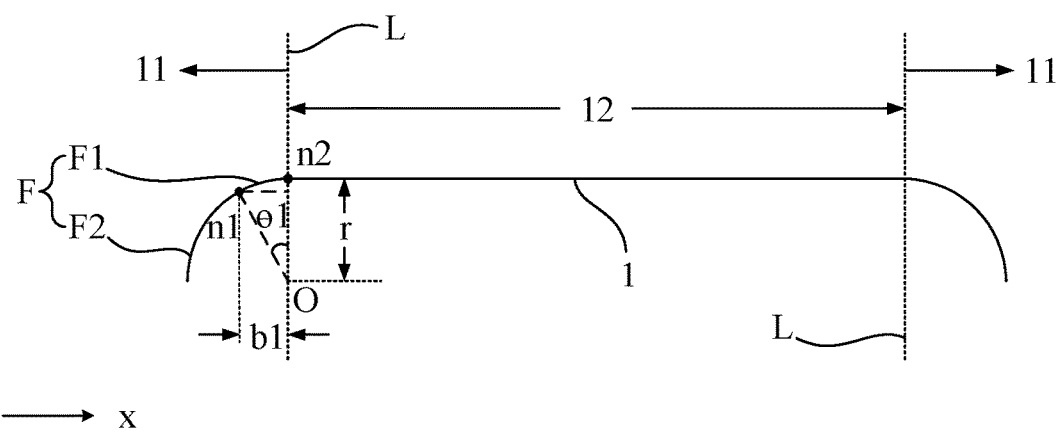
FIG. 12 is another schematic cross-sectional structural diagram of the flexible display panel shown in FIG. 7 in a bent state.
Figure 13:
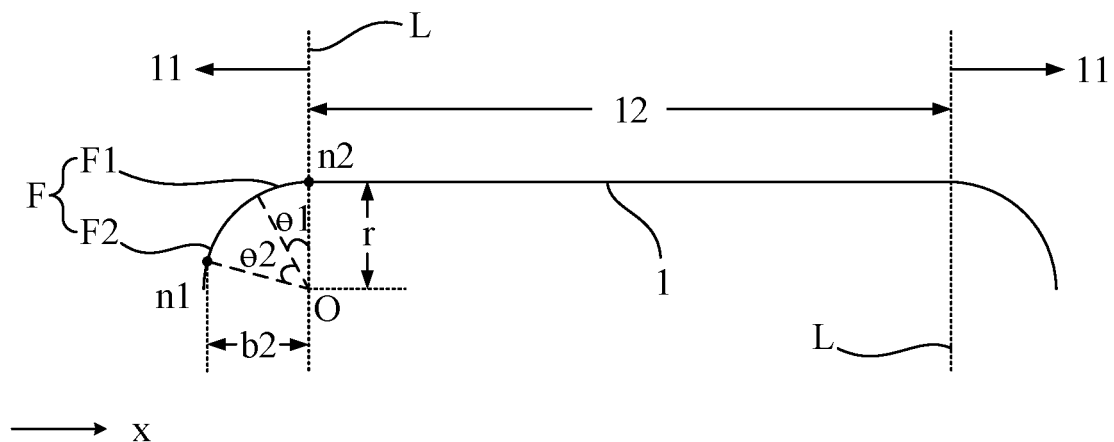
FIG. 13 is another schematic cross-sectional structural diagram of the flexible display panel shown in FIG. 7 in a bent state.

FIG. 12 is another schematic cross-sectional structural diagram of the flexible display panel shown in FIG. 7 in a bent state, and FIG. 13 is another schematic cross-sectional structural diagram of the flexible display panel shown in FIG. 7 in a bent state. In an embodiment, as shown in FIGS. 7-13, optionally, the flexible display panel 1 has a virtual vertical cross-section 3, and a virtual sector corresponding to the bent edge area 11 is formed in the virtual vertical cross-section 3, and the virtual sector corresponds to a circle having a circle center O. The virtual vertical cross-section 3 is perpendicular to the flexible display panel 1 and the column direction h2. The virtual vertical cross-section 3 intersects with two side edges of each column of sub-pixels located in the bent edge area 11 extending in the column direction h2 to form a first intersection point n1 and a second intersection point n2. Here, the first intersection point n1 is further away from the planar area 12 than the second intersection point n2. An intersection of the bent edge area 11 with the virtual vertical cross-section 3 is an arc F.

In particular, the virtual vertical cross-section 3 is represented by a dotted-line frame as shown in FIG. 7, and the cross-sectional view shown in FIG. 8 is a portion of the flexible display panel 1 taken in the virtual vertical cross-section 3 shown in FIG. 7. In this embodiment, the intersection of the bent edge area 11 with the virtual vertical cross-section 3 is an arc, so that the bent edge area 11 can be designed to provide better display effect by using a geometric principle of a sector.

In an embodiment, an angle Θ corresponding to the arc F is smaller than or equal to 90°.

In an embodiment, as shown in FIG. 12, a column of sub-pixels located in the bent edge area 11 that is closest to the planar area 12 is referred to as a first column of the edge sub-pixels. The circle corresponding to the sector having a radius r. "b1" is vertical distance between the first intersection point n1 of the first column of edge sub-pixels and a line connecting the second intersection point n2 of the first column of edge sub-pixels with the circle center O. An arc formed by the first column of edge sub-pixels intersecting with the virtual vertical cross-section 3 is referred to as a first arc F1. The first arc F1 corresponds to an angle $\Theta 1$, where $b1=r*\sin \Theta 1$.

A distance between any point on the first arc F1 (including the first intersection point n1 and the second intersection point n2) and the circle center O is the radius r. In the bent state and at the front viewing angle, the size of the orthographic projection of the column of sub-pixels 2 located in the bent edge area 11 onto the plane of the planar area 12 in the x direction is b1, i.e., b1=H3. Therefore, in order to make b1 close to the size H2 of each column of sub-pixels 2 located in the planar area 12 in the row direction h1, the corresponding $\Theta 1$ can be set according to the above formula.

In an embodiment, optionally, the size of each column of sub-pixels 2 located in the planar area 12 in the row direction h1 is b, where b1=b, that is, b1=b=H2. In this case, at the front viewing angle, the display effect of the first column of edge sub-pixels located in the bent edge area 11 is the same as the display effect of each column of sub-pixels 2 located in the planar area 12.

In an embodiment, as shown in FIG. 13, a column of sub-pixels located in the bent edge area 11 that is closest to the first column of edge sub-pixels is referred to as a second column of edge sub-pixels. A vertical distance between the first intersection point n1 of the second column of edge sub-pixels and a line connecting the second intersection point n2 of the first column of edge sub-pixels with the circle center O is b2. An arc formed by the second column of edge sub-pixels intersecting with the virtual vertical cross-section 3 is referred to as a second arc F2. The second arc F2 corresponds to an angle Θ2, where b2=r*sin(Θ1+Θ2).

According to the principle for setting Θ1, the corresponding Θ2 can be further set according to the above formula.

In an embodiment, the size of each column of sub-pixels located in the planar area 12 in the row direction h1 is b, where b1=b and/or b2=2b, When b1=b and b2=2b, at the front viewing angle, the display effect of the first column of edge sub-pixels and display effect of the second column of edge sub-pixels located in the bent edge area 11 is the same as the display effect of each column of sub-pixels 2 located in the planar area 12. It should be understood that, other columns of sub-pixels located in the bent edge area 11 can be determined and designed in an analogous way so that the display effect of each column of sub-pixels located in the bent edge area 11 is closer to the display effect of each column of sub-pixels located in the planar area 12.

It is to be noted that, in another embodiment, at the front viewing angle, the size of the first column of edge sub-pixels in the x direction is equal to the size of each column of sub-pixels located in the planar area 12 in the x direction, and the size of other column of sub-pixels located in the bent edge area 11 in the x direction is smaller than the size of each column of sub-pixels located in the planar area 12 in the x direction.

In still another embodiment, at the front viewing angle, the size of the first column of edge sub-pixels located in the x direction is equal to the size of each column of the sub-pixels located in the planar area 12 in the x direction, and in a case where the flexible display panel 1 is in the flattened state, the size of other column of sub-pixels located in the bent edge area 11 in the x direction is equal to the size of the first column of edge sub-pixels in the x direction.

In an embodiment, a pixel aperture area of the sub-pixel 2 located in the bent edge area 11 is larger than a pixel aperture area of the sub-pixel 2 having same color located in the planar area 12.

The sub-pixels 2 may include a plurality of sub-pixels having different colors, such as red sub-pixels, green sub-pixels, and blue sub-pixels. Multiple sub-pixels having different colors constitute one pixel. For each pixel, its sub-pixels having different colors may have different aperture areas. At the front viewing angle, after bending to form a curved surface, the brightness of the sub-pixel located in the bent edge area 11 is attenuated when compared with the flattened state. When the size H1 of each column of sub-pixels 2 located in the bent edge area 11 in the row direction h1 is larger than the size H2 of each column of sub-pixels 2 located in the planar area 12 in the row direction h1, that is, when the pixel aperture area of the sub-pixel 2 located in the bent edge area 11 is larger than the pixel aperture area of the sub-pixel 2 having the same color located in the planar area 12 (the pixel aperture area herein refers to an actual pixel aperture area, i.e., the pixel aperture area of the sub-pixel 2 in the flatten state), even if the brightness of the sub-pixel located in bent edge area 11 is attenuated, in the bent state and at the front viewing angle, the display brightness of the bent edge area 11 is closer to the display brightness of the planar area 12.

In an embodiment, optionally, the sub-pixels 2 include red sub-pixels, green sub-pixels, and blue sub-pixels. In the bent edge area 11, the pixel aperture area of the red sub-pixel is larger than the pixel aperture area of the green sub-pixel, and the pixel aperture area of the blue sub-pixel is larger than the pixel aperture area of the green sub-pixel.

For a pixel that includes a red sub-pixel, a green sub-pixel and a blue sub-pixel, the brightness of the green sub-pixel has a greater attenuation than the brightness of the red sub-pixel and the brightness of the blue sub-pixel in the bent edge area 11. Therefore, each of the pixel aperture area of the red sub-pixel and the pixel aperture area of the blue sub-pixel in the bent edge area 11 is set to be larger than the pixel aperture area of the green sub-pixel, so that in the bent state and at the front viewing angle, the display effect of the bent edge area 11 can be closer to the display effect of the planar area 12.

In an embodiment, optionally, the flexible display panel 1 includes respective data lines 4 corresponding to each column of sub-pixels 2. The data lines 4 are each arranged in the row direction h1 and each extend in the column direction h2. In an extending direction of the plane of the flexible display panel 1 (i.e., in the flattened state), the size of each column of sub-pixels 2 in the row direction h1 is a distance between two adjacent data lines 4.

Each column of sub-pixels 2 corresponds to one of the data lines 4. Therefore, in an embodiment of the present disclosure, the data line 4 is used as a boundary between two adjacent columns of sub-pixels 2, so as to distinguish sub-pixels 2 in different columns. In practice, for example, each column of sub-pixels 2 includes a pixel driving circuit and a light-emitting device corresponding to each sub-pixel 2, and the pixel driving circuit is connected to the corresponding data line 4 and configured to drive the corresponding light-emitting device to emit light. The light-emitting device emits light through the pixel aperture of this sub-pixel 2, so as to allow the sub-pixel to emit light and display. Therefore, in other embodiments, boundaries between columns of sub-pixels 2 can also be defined in other manners.

In an embodiment, the flexible display panel 1 has two bent edge areas 11. In the row direction h1, the planar area 12 is located between the two bent edge areas 11 to form symmetrical curved surfaces, thereby providing a better display effect. It should be understood that the embodiments of the present disclosure are not limited to the number and locations of the bent edge areas 11. For example, in other embodiments, the bent edge area 11 may be arranged around the flexible display panel 1, or the bent edge area 11 may be arranged only on one side of the flexible display panel 1.

Figure 14:
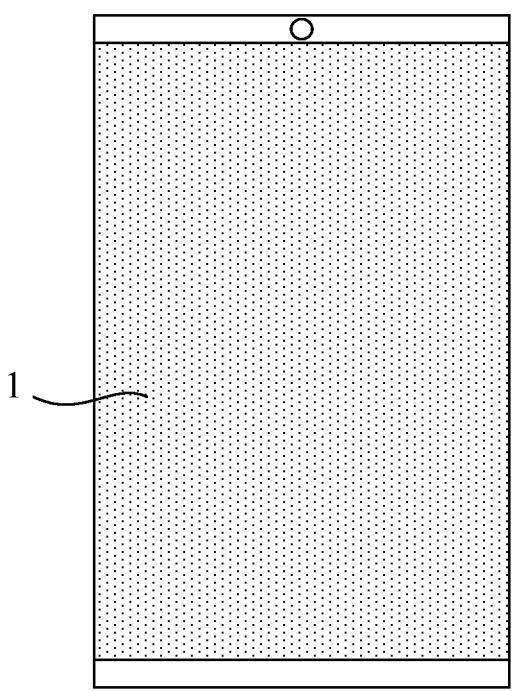
FIG. 14 is a schematic structural diagram of a display device according to an embodiment of the present disclosure.

FIG. 14 is a schematic structural diagram of a display device according to an embodiment of the present disclosure. As shown in FIG. 14, an embodiment of the present disclosure provides a display device, including the above-mentioned flexible display panel 1.

The display device in the embodiments of the present disclosure may be an electronic device having a display function, such as a touch display screen, a cellphone, a tablet computer, a notebook computer, an electronic paper book, or a television.

In the embodiments of the present disclosure, for the display device including the flexible display panel, the size of each column of sub-pixels located in the bent edge area in the row direction is larger than the size of each column of sub-pixels located in the planar area in the row direction, so that in the bent state and at the front viewing angle, the size of each column of sub-pixels located in the bent edge area is closer to the size of each column of sub-pixels located in the planar area. In this way, on one hand, the display effect in the bent edge area becomes consistent with the display effect in the planar area at the front viewing angle, thereby mitigating the degradation of the display effect resulted from the curved surface formed in the bent edge area. On the other hand, since the size of each column of sub-pixels located in the bent edge area has a smaller difference from the size of each column of sub-pixels located in the planar area, sub-pixel brightness collection accuracy can be improved when the brightness of each sub-pixel is collected by a camera at the front viewing angle. In this way, the effect of compensation for the data of the sub-pixel is more accurate, thereby improving the display effect.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

Finally, it should be noted that, the above-described embodiments are merely for illustrating the present disclosure but not intended to provide any limitation. Although the present disclosure has been described in detail with reference to the above-described embodiments, it should be understood by those skilled in the art that, it is still possible to modify the technical solutions described in the above embodiments or to equivalently replace some or all of the technical features therein, but these modifications or replacements do not cause the essence of corresponding technical solutions to depart from the scope of the present disclosure.

What is claimed is:

1. A flexible display panel, having at least one bent edge area and a planar area, the flexible display panel comprising a plurality of sub-pixels arranged in a matrix in a row direction and a column direction that is perpendicular to the row direction;
    wherein the at least one bent edge area and the planar area are arranged in the row direction, a boundary extends in the column direction between each of the at least one bent edge area and the planar area, a side of each of the at least one bent edge area that is away from the planar area is bent towards a non-light-exiting side of the flexible display panel, so that a portion of the flexible display panel that is located in each of the at least one bent edge area forms a curved surface when the flexible display panel is in a bent state;
    wherein a size of each column of sub-pixels located in the at least one bent edge area in the row direction is larger than a size of each column of sub-pixels located in the planar area in the row direction, and
    wherein a size of an orthographic projection of at least one column of sub-pixels located in each of the at least one bent edge area onto a plane of the planar area in the row direction is equal to a size of at least one column of sub-pixels located in the planar area in the row direction.

2. The flexible display panel according to claim 1, wherein in each of the at least one bent edge area, the size of each column of sub-pixels in the row direction increases with a distance away from the planar area.

3. The flexible display panel according to claim 2, wherein a size of an orthographic projection of each column of sub-pixels located in each of the at least one bent edge area onto a plane of the planar area in the row direction is equal to a size of each column of sub-pixels located in the planar area in the row direction.

4. The flexible display panel according to claim 2, wherein when the flexible display panel is sectioned in a direction perpendicular to the flexible display panel, a vertical cross-section is obtained, and a sector corresponding to each of the at least one bent edge area is formed in the vertical cross-section.

5. The flexible display panel according to claim 4, wherein a central angle corresponding to the sector is smaller than or equal to 90°.

6. The flexible display panel according to claim 4, wherein
    the sector corresponds to a circle having a circle center; the vertical cross-section intersects with two side edges of each column of sub-pixels located in the at least one bent edge area to form a first intersection point and a second intersection point in the row direction; and the first intersection point is further away from the planar area than the second intersection point,
    a column of sub-pixels located in the at least one bent edge area that is closest to the planar area is referred to as a first column of edge sub-pixels, and wherein the circle corresponding to the sector has a radius of r; a vertical distance between the first intersection point of the first column of edge sub-pixels and a line connecting the second intersection point of the first column of edge sub-pixels with the circle center is b1; an arc formed by the first column of edge sub-pixels intersecting with the vertical cross-section is a first arc, and the first arc corresponds to an angle $\Theta1$; where $b1=r*\sin \Theta 1$, and
    wherein each column of sub-pixels located in the planar area has a size b in the row direction, where $b1=b$.

7. The flexible display panel according to claim 6, wherein a column of sub-pixels located in the at least one bent edge area that is closest to the first column of edge sub-pixels is a second column of edge sub-pixels; a vertical distance between the first intersection point of the second column of edge sub-pixels and a line connecting the second intersection point of the first column of edge sub-pixels with the circle center is b2; an arc formed by the second column of edge sub-pixels intersecting with the vertical cross-section is a second arc, and the second arc corresponds to an angle $\Theta2$; where $b2=r*\sin(\Theta1+\Theta2)$, and
    wherein each column of sub-pixels located in the planar area has a size b in the row direction, wherein:
    $b1=b$ or $b2=2b$, or
    $b1=b$ and $b2=2b$.

8. The flexible display panel according to claim 1, wherein each sub-pixel located in the at least one bent edge area has a larger pixel aperture area than each sub-pixel of same color located in the planar area.

9. The flexible display panel according to claim 1, wherein sub-pixels comprise red sub-pixels, green sub-pixels, and blue sub-pixels; in the at least one bent edge area, the pixel aperture area of each red sub-pixel is larger than the pixel aperture area of each green sub-pixel, and the pixel aperture area of each blue sub-pixel is larger than the pixel aperture area of each green sub-pixel.

10. The flexible display panel according to claim 1, wherein the flexible display panel further comprises respective data lines corresponding to each column of sub-pixels, and the data lines are each arranged along the row direction and extend along the column direction in an extending direction of a plane of the flexible display panel, and wherein the size of each column of sub-pixels in the row direction is a distance between two adjacent data lines.

11. The flexible display panel according to claim 1, wherein the at least one bent edge area comprises two bent edge areas, and the planar area is located between the two bent edge areas in the row direction.

12. A display device, comprising the flexible display panel according to claim 1.

* * * * *